June 17, 1952     F. H. KING     2,600,883
PLUNGER GUIDE FOR MARBLE SHOOTERS
Filed Dec. 23, 1947
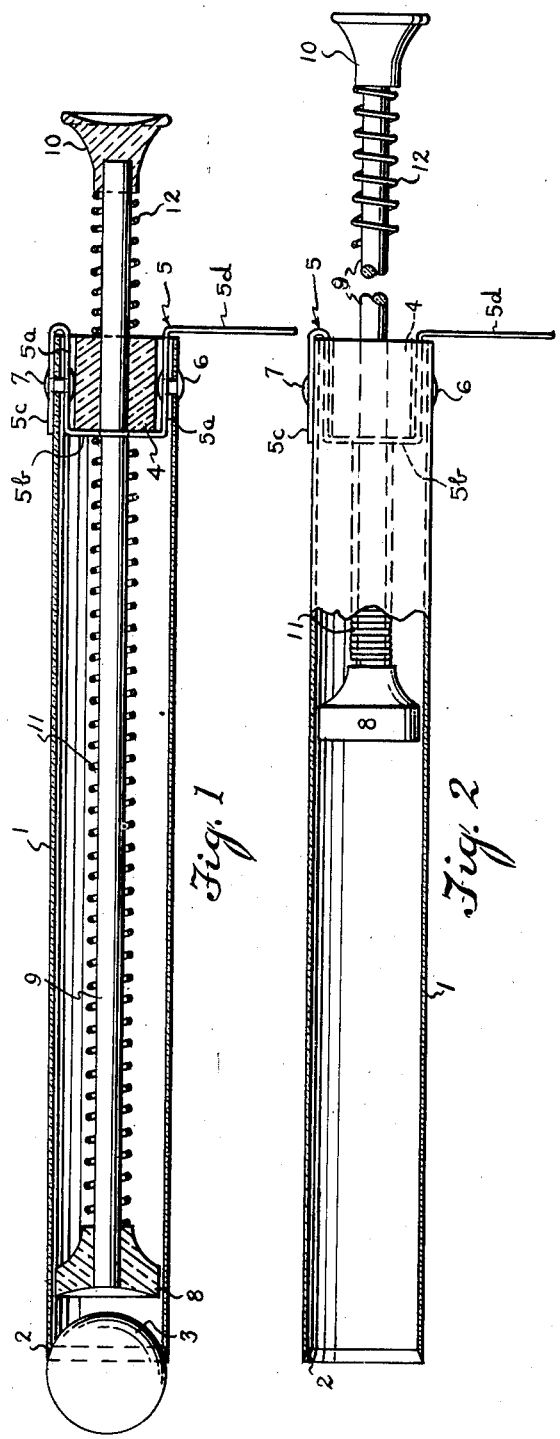
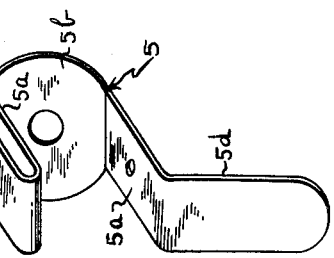
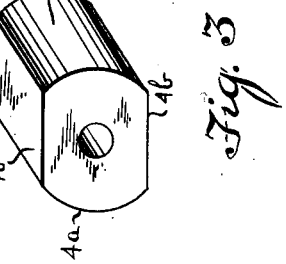
INVENTOR.
Frederick H. King
BY
ATTORNEY Patented June 17, 1952

2,600,883

UNITED STATES PATENT OFFICE 2,600,883

PLUNGER GUIDE FOR MARBLE SHOOTERS

Frederick H. King, Detroit, Mich.

Application December 23, 1947, Serial No. 793,353

4 Claims. (Cl. 124—30)

This invention relates to ball or marble shooters and particularly to spring energized devices for shooting balls or marbles.

An object of the invention is to provide a shooter of a cylinder and plunger type.

Another object is to provide in a novel manner for installing a plunger guiding head terminally in the cylinder of a ball or marble shooter.

These and various other objects are attained by the construction hereinafter described and illustrated in the accompanying drawing, wherein:

Fig. 1 is an axial sectional elevational view of the shooter with its plunger in forward position.

Fig. 2 is a side elevational and partially sectional view of the same with the plunger retracted.

Fig. 3 is a perspective view of a plastic element of a composite head.

Fig. 4 is a perspective view of a metal element of said head.

In these views, the reference character 1 designates an elongated cylinder formed preferably of plastic tubing. Said cylinder has an open front end which is interiorly chamfered, as indicated at 2, around its entire periphery at a wedging angle, as for example twenty degrees. By reason of this chamfer, a ball or marble 3 of a diameter slightly exceeding the minimum interior diameter of the cylinder may be readily frictionally retained in said open end. A preferred ball for my purpose is formed of sponge rubber, whereby it may undergo a slight compression as it is forced into the chamfered end.

Inserted and secured in the rear end of the cylinder is a composite head comprising a plastic plug 4 and a sheet metal element 5. Said plug has opposed cylindrical faces 4a proportioned to engage the interior face of the cylinder to which said faces are cemented. Between its faces 4a, the plug has plane faces 4b sufficiently spaced from the cylinder to accommodate parallel arms 5a of the element 5. Said arms are integrally connected within the cylinder by a disk portion 5b of said element abutting the inner end of the plug 4. The arms 5a have extensions 5c and 5d exterior to the cylinder, the former bent to extend forward along the outer face of the cylinder and the latter projecting transversely to the cylinder. Rivets 6 and 7 secure the arms 5a to the cylinder, the rivet 7 further engaging the extension 5c.

A plunger 8 freely slidable in the cylinder is fixed on the forward end of a rod 9, slidably mounted in said composite head and having a knob 10 or other suitable handle on its rear end. An elongated coiled spring 11 is carried by said rod between the plunger and the disk portion 5b of the head, maintaining the plunger normally in the front portion of the cylinder. A relatively short shock-absorbing spring 12 is mounted on the rod between the plug 4 and knob 10.

In use of the described toy, the ball 3 is first lodged in the front end of the cylinder. This may be quickly and easily done by pressing said open end downward against the ball, as the latter lies on any supporting surface. The plunger is now retracted by its rod, fully compressing the spring 11. In effecting this compression, the cylinder is usually gripped near its rear end by one hand, while the other retracts the knob 10, the resulting position of the parts appearing in Fig. 2. When the knob is released, the plunger is driven forward very forcibly, impacting the ball and transferring to it a powerful momentum. In the case of a sponge rubber or other resilient ball, the impact applies a compression to the ball which adds to said momentum. The spring 12 cushions the force applied to the cylinder in halting travel of the plunger and rod, and avoids a violent impact of the knob 10 with the headed end of the cylinder. The extension 5d lies against the hand holding the cylinder and aids in resisting any tendency of the cylinder to escape from such hand, particularly when the spring 11 takes effect.

The described toy is inexpensive and has been found highly attractive to children.

What I claim is:

1. In a ball or marble shooter, the combination with a hollow cylinder having a front or outlet end and a rear end, of a non-metallic plug inserted in said rear end and having opposed curved faces substantially conforming in shape to the cylinder and having opposed plane faces between said curved faces, a metallic disk seating the inner end of said plug, arms carried by said disk engaged between the cylinder and plane faces of the plug, and means securing said arms to the cylinder.

2. In a ball or marble shooter, the combination with a hollow cylinder having a front or outlet end and a rear end, of a plug fixedly inserted in said rear end, and an element formed of sheet material having a portion seating the inner end of the plug and having arms extending rearwardly at opposite sides of the plug, and means securing each of said arms to the cylinder.

3. In a ball or marble shooter as set forth in claim 2, one of said arms being formed with a U-bend straddling the cylinder wall.

4. In a ball or marble shooter as set forth in claim 1, means adhesively securing said curved faces of the plug to the cylinder.

FREDERICK H. KING.

REFERENCES CITED

The following references are of record in the file of this patent:

UNITED STATES PATENTS

| Number | Name | Date |
|---|---|---|
| 288,548 | Clark | Nov. 13, 1883 |
| 606,546 | Hayes | June 28, 1898 |
| 768,028 | Braun | Aug. 23, 1904 |
| 899,448 | Grobl | Sept. 22, 1908 |
| 937,078 | Laudermilch | Oct. 19, 1909 |
| 944,715 | Blodgett | Dec. 28, 1909 |
| 1,070,039 | Kennedy | Aug. 12, 1913 |
| 1,358,959 | Lefever | Nov. 16, 1920 |
| 1,585,075 | Boyce | May 18, 1926 |
| 2,182,369 | Barron | Dec. 5, 1939 |